UNITED STATES PATENT OFFICE.

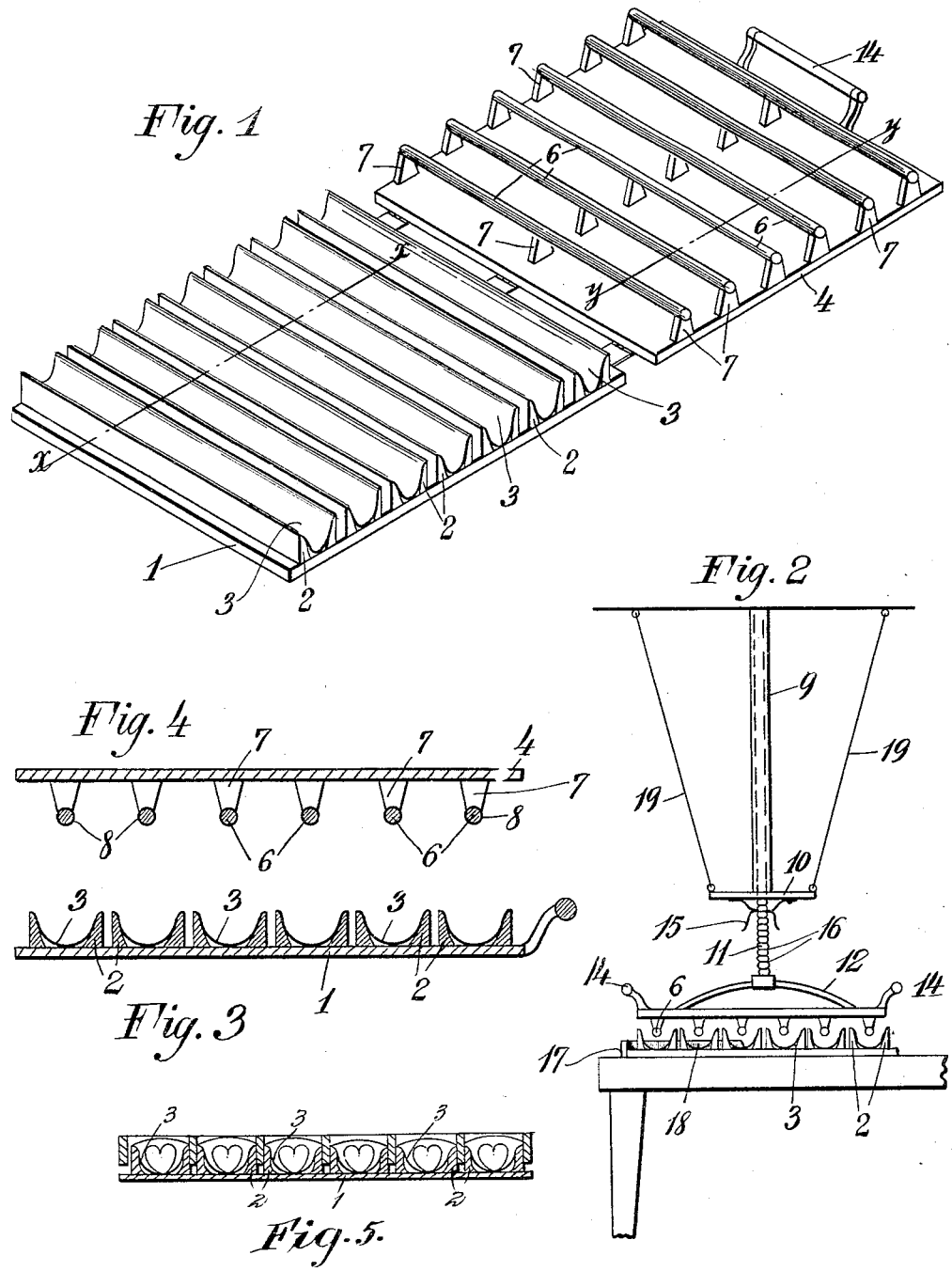

EDWARD E. BRODHEAD, OF NEW YORK, N. Y.

BAKER'S UTENSIL.

1,112,764.  Specification of Letters Patent.  Patented Oct. 6, 1914.

Application filed April 26, 1912. Serial No. 693,499.

*To all whom it may concern:*

Be it known that I, EDWARD E. BRODHEAD, a citizen of the United States of America, residing at the city of New York, in the county and State of New York, have invented certain new and useful Improvements in Bakers' Utensils, of which the following is a specification.

My invention relates to bakers' utensils and more particularly to a labor saving device, which I term a roll-holder or receiver, so constructed and arranged as to permit the splitting of the rolls therein by one movement of a splitter and their transfer to a transfer board, without disturbing their relatively proper positions and without manual contact.

Many bakers do not wish to make rolls, especially what are called French rolls, because the labor involved in making them and handling them the number of times the usual process includes, is so expensive that the profit is very small or wholly absent. The creasing by hand as now practised, unless done by a particularly skilful baker, is apt to be uneven, that is, the crease is liable to be so placed that the quantities of dough are not even on the two sides of the crease. Then one side will be baked before the other and the result will be a product with one side not fully baked or the other too much dried out. My device avoids this result and at the same time so reduces the amount of labor required that it permits the making of profit where none was made, or of greatly enhancing the profit where one already existed.

Figure 1 is a perspective view of a simple form of my device in which the two parts are hinged together. Fig. 2, shows a form of the device which I employ when the creasing board is to be permanently suspended over a bench or table. Fig. 3, is a cross sectional view of the holder, on line *x—x* of Fig. 1. Fig. 4 is a cross sectional view on line *y—y* of Fig. 1. Fig. 5, is a cross-sectional view of my roll-holder and a transfer board, in the positions they occupy when the rolls have been creased or split and the transfer board has been placed over the roll holder, in position to receive the rolls therefrom when the boards are turned over, the rolls being shown in full lines.

In the device shown in Fig. 1, there is first a base board 1, which may be made of sheet steel or of wood or of vulcanized fiber or almost any material having sufficient strength, durability and inflexibility to maintain a flat even surface and retain the parts in proper alinement. Well seasoned wood covered with galvanized iron which projects over the sides and extends a short distance under the bottom, is very acceptable and economical. On this base 1, I mount a number of longitudinal bracket pieces 2, preferably a dozen, the length of the board and of these pieces being preferably a little in excess of the aggregate length of six rolls. These ribs or pieces 2 may be made of wood or of metal, but galvanized iron would suffice, and they are preferably three cornered with bases broader than the upper edges, in order that they may easily retain their positions and arrangement. I secure them to the board with screws or nails passing through their bases and into the board or receiver. They are arranged in pairs as shown, with the slanting faces opposite each other so as to constitute sides for the cradles or troughs which they are intended to support, and each set is spaced from the next to accommodate the divisions of a transfer board. On these bracket pieces I secure cloth strips 3, preferably canvas, about as long as the strips and wide enough to extend from one bracket piece to the other with a sufficient bight between to reach to the bottom of and across the intervening space. They thus form troughs or cradles adapted to receive and hold a series of rolls, tandem, and if of the length and number described, the board will hold thirty-six rolls. A creasing board adapted for use with this holder consists of a cover 4, substantially similar to base 1, and of a substantially corresponding size, though a frame with suitable strengthening ribs such as 5 would answer. On this board 4 (or in the frame 4) I mount a number of creasing or splitting rods 6, preferably round rods 6, secured to pieces 7 which like pieces 2, have a base wider than the top. The form shown is preferable though I might make the rib and rod in one piece, but it is more convenient and economical to make them as independent pieces. The rod or rod part I cover with cloth 8. It may be readily rolled around the rods and held in place by nailing the rods securely to the pieces 7, they in turn being screwed or otherwise secured to the cover or frame 4. The ribs are long enough to properly sustain the rods and the rods are about as long as the cradles and so spaced that when the boards are brought together, the rods will register respectively with lines drawn centrally between the bracket pieces, which of course will also be centrally of the cradles, and their projections from the covering board 4, is such that when the two boards are brought together, these rods will project down into the cradles sufficiently to press upon and dent, crease or split such rolls as may be in the cradles. If the boards are hinged together, as shown in Fig. 1, the hinges will so guide the cover in its descent as to insure that the rods and cradles shall register accurately.

If the cover is to be suspended and the base board is to be placed upon a bench or table, then I secure a bracket or suitable suspending device, to the ceiling, the wall or a support extending upward from the bench. A very convenient arrangement consists of a hollow rod 9, secured to the ceiling or other suitable support, and extending down to and into a disk 10, rigidly secured to the rod 9, near its lower end, and held rigidly in position by tension wires 19. Then a rod 11 extending upward from crossbars 12, secured to the cover board 4, may be inserted into the space within the hollow rod 9 and by moving it up or down therein the cover may be lifted from or brought down upon the complemental board provided with cradles. In such case I provide a handle 14 for lifting the cover and a spring click 15 working in a smooth edged rack 16 on the rod 11, may be employed for holding the cover board at any desired height.

I do not limit myself to the form of support shown in Fig. 2 nor to any particular form of creasing board, since the form and arrangement of the support will depend largely upon the surroundings of the location selected. In case the cover board is thus permanently mounted, independently of the cradle board or holder, I employ stops 17 18, or some equivalent, to insure the rapid and easy placing of the cradle board or holder where it will register accurately with the cover board.

The operation is as follows: The cradle board or holder is dusted with flour and charged with rolls, preferably 36 as already stated. They will seat themselves smoothly and evenly in the cradles. Then the cover is brought down upon the cradle board. If the parts are hinged as shown in Fig. 1, that is done by merely turning the cover on its hinges. If the suspended cover board is used, the cradle board must be placed on the bench, table or other support and pushed into position against its stops. Then the cover board is brought down by seizing the handle 14 and depressing the board until it contacts with the cradle board. The rods 6, also flour dusted, will as is manifest, come into contact with the rolls in the cradle board and bearing down upon them will dent, crease or split each one exactly in the middle, which is the result desired, then the cover may be lifted, the cradle board covered with a transfer board, and turned over. If the roll-holder cradles had no spaces between them, then the partitions of the transfer board (for instance such a one as shown in my U. S. Patent 1,007,670, of Nov. 9, 1911), could not pass down below the upper surface of the cradles, the spaces in the transfer board troughs or cradles, above the rolls, would be the full depth of the transfer board troughs and when the boards were turned over to effect the shifting of the rolls from one board to the other, the rolls, in falling even that distance, would be likely to be so disarranged as to require that the baker rearrange them, at the cost of the labor, the time and the loss of the sanitary feature, but with my holder, the transfer board may be set so that the partitions of its troughs pass between the supports of the cradles of the roll-holder, as seen in Fig. 5, thus bringing the bottom of the transfer troughs so close to the upper faces of the rolls in the holder that, when the boards are turned over together, there is no opportunity for the rolls to fall out of arrangement, for they have substantially no space within which to fall, they merely rest on their faces instead of their bases. The rolls will rest on the transfer board and it may be carried to the oven, a baker's peel placed over it and the whole turned over, when the rolls, duly creased, will rest upon the peel and may be pushed into the oven. It is thus seen that the creasing and placing in the oven may be done with substantially six movements, after the rolls are placed in the cradle, one, the downward movement of the cover board; two, its lifting; three, the placing of the transfer; four, its turning; five, the placing of the peel and six, the turning of the transfer board and the peel. As now practised it would take 36 to crease the rolls individually, 36 more to place them on a carrier and 36 more to place them on the peel, an aggregate of 108, in place of the six I have named. The labor saving feature is apparent, besides which the creasing is even, whereas hand creasings would be likely to be somewhat uneven.

The transfer board described may be a board with six troughs adapted to rest over the cradles and two or more projecting strips adapted to take into the spaces between the creases and thus be easily and accurately placed to receive the rolls upon the turning of the cradle board. One which has been found to be satisfactory is shown in my Patent 1,007,670 granted November 7, 1911.

What I claim as my invention and desire to secure by Letters Patent is:

A roll holder adapted for use in a roll splitting device and consisting of a base board, a series of roll receiving cradles formed of textile material, and a series of cradle supports, one at each side of each cradle and so secured to it as to support the same, but separated from the adjacent support of the next cradle by a space sufficient to permit the entry of a partition of a transfer box, all substantially as set forth.

In testimony whereof, I have signed my name to this specification in the presence of two subscribing witnesses, this 23d day of April, 1912.

E. E. BRODHEAD.

Witnesses:
WM. J. SINGER,
A. G. N. VERMILYA.

Copies of this patent may be obtained for five cents each, by addressing the "Commissioner of Patents, Washington, D. C."